United States Patent Office 3,556,801
Patented Jan. 19, 1971

3,556,801
METHOD FOR THE MANUFACTURE OF A CONCENTRATE OF A BIFIDOGEN FACTOR
Hermann Gustav Hostettler, Liebefeld, Bern, Switzerland, assignor to Ursina A.G., Bern, Switzerland
No Drawing. Filed Jan. 18, 1967, Ser. No. 610,027
Claims priority, application Switzerland, Jan. 18, 1966, 608/66
Int. Cl. A23c *11/00*
U.S. Cl. 99—14                                                                                       4 Claims

ABSTRACT OF THE DISCLOSURE

This invention relates to a method for the manufacture of a bifidogen factor called "Bifidus 2" ($BF_2$) with enhanced activity. The process of the invention is characterized by passing a protein hydrolysate containing the factor $BF_2$ at least twice through a chromatographic column of an ion-exchange resin or through a dextran gel. The first chromatography is characterized by passing the hydrolysate through a column of a strong acid cation exchange resin in the acid form. The second chromatography is characterized by passing the concentrated eluate from the first chromatography process through a column of a weak acid cation exchange resin. The $BF_2$ concentrate is then obtained by a further chromatographic process using a basic anion exchange resin, or filtering the solution through gel. The process is directed towards obtaining an improvement in the yield of $BF_2$ concentrate from protein hydrolysate solution.

---

This invention relates to a method for the manufacture of a bifidogen factor called "Bifidus 2" ($BF_2$) with enhanced activity. It is known in the art that the microorganism Bifidus (synonyms: *Bifidibacterium bifidum, Lactobacillus bifidus, Actinobacterium bifidum*) is to be found preponderantly in the alimentary canal of suckling children. In the faeces of suckling children nourished with mother's milk the *Lactobacillus bifidus* represents 90% of the intestinal bacteria. When changing the feeding from mother's milk to the usual milk a complete change of the intestinal bacteria takes place. After this the *Lactobacillus bifidus* vanishes completely or otherwise represents only a little part of the intestinal bacteria of the suckling child nourished with cow's milk and a still smaller part of the intestinal bacteria of children fed with mixed nourishment and of adults. Tests have been made for a long time to change the composition of the food of suckling children not nourished with mother's milk so as to ensure that the *Lactobacillus bifidus* remains in the faeces. Compositions of foodstuffs effecting this are called "bifidogen." Such bifidogen foodstuff can be obtained by:

(1) Food additives in the reaction mechanism of which is unknown,
(2) Additions to cows' milk of growth factors which are necessary for the growth of *Lactobacillus bifidus*.

Included in the first group is the method of Petuely which consists in the increase of the ratio Lactose/Protein and in the addition of Lactulose. In vitro this method shows no effect on *Lactobacillus bifidus*.

In order to realize the second possibility it is necessary to know the growth factors which are needed by *Lactobacillus bifidus*.

Certain special mutants need a factor (factor bifidus 1) the special activity of which can be met by a series of derivatives of N-acetyl glucosamine, in particular by the 4-0-galactosidyl-N-acetyl glucosamine and the β-alkyl-N-acetyl glucosaminide. It is supposed that this mutant fills up a nonidentified gap in the chain of reactions which give rise to the mucopeptid in the coat of the stomach and of the intestine. Raynaud has shown that nearly all of the bacteria recoverable from the faeces of suckling children do not need this factor, but only grow in the presence of another substance, called "bifidus 2" by Raynaud. The presence of the factor has been exactly verified. *Lactobacillus bifidus* grows in a nutrient medium containing various amino acids, p-aminobenzoic acid, biotin and calcium pantothenate only if a preparation containing the factor bifidus 2 is added to the mixture.

The nutrient medium used consists of the following ingredients:

Asparagine—5 g.
Amino acids obtained by acid hydrolysis of casein (Casamino-acids DIFCO)—10 g.
Cystine—0.200 g.
Lactose—10 g.
Sodium acetate ·$6H_2O$—5 g.
$MgSO_4$·$7H_2O$—0.5 g.
$Na_2HPO_4$·$12H_2O$—2.33 g.
$KH_2PO_4$—0.90 g.
p-Aminobenzoic acid—1 mg.
Biotin—0.010 mg.
Calcium pantothenate—1 mg.
$H_2O$, q.s. to 500 ml.
pH=6.4

2.5 ml. of this medium are used together with a standardized inoculum resulting in a total volume of 5 ml. One unit $BF_2$ corresponds to that amount which after 5 days anaerobic fermentation at 100° F. results in the growth of that amount of germs which result in the production of such amount of acids (acetic and lactic acid) which is equivalent to one ml. N/10 acid per test tube of 5 ml. contents. This method verified that the factor $BF_2$ is not identical with any of the known growth factors. In particular, it cannot be replaced by any purine (adenine, guanine, hypoxanthine), further it can not be replaced by streptogenin-rich preparations.

It has been found that the factor $BF_2$ is present in enzyme hydrolysates of proteins, in particular of casein, in different amounts depending on the reaction conditions. It has been possible to produce $BF_2$-rich enzyme hydrolysates with 5000 to 20,000 units/g. By administering these preparations to suckling children it has been found that the addition of the factor $BF_2$ to a bifidogen foodstuff, the amount of *Lactobacillus bifidus* in the faeces is essentially increased. If sufficient amounts of $BF_2$ were used *Lactobacillus bifidus* represented 40 to 95% of the intestinal bacteria.

One object of the present invention is a process for the manufacture of preparations rich in $BF_2$. The purest product produced up to now contained 3,000,000 units $BF_2$ per gram and it is peptid-like.

The process of the invention is characterized by passing a protein hydrolysate containing the factor $BF_2$ at least twice through a column of an ion-exchange resin.

The first chromatography is characterized by passing the hydrolysate through a column of a strong acid cation exchange resin in the acid form. In a preferred embodiment of this invention is used as strong acid cation exchange resin a sulfonic acid group containing styrene resin such as for instance "Dowex 50 X 4" (mesh size 50–100) in the acid form.

100 g. protein hydrolysate containing the factor $BF_2$ are dissolved in 1 N sulfuric acid (e.g. 100 g. in 1000 ml.) and any insoluble fraction is removed by filtration. The pure solution was placed on top of a column of Dowex 50 X 2 (mesh size 50–100); for instance, a column of 2.5 cm. diameter and 35 cm. height can be used. The fraction passing through the column without being adsorbed is disregarded. The fraction being adsorbed by the resin is eluted at first with 2 N ammonia and then with water (e.g. 1000 ml. ammonia, 1000 ml. water). This fraction is concentrated under reduced pressure removing the greatest part of the ammonia. Instead of the Dowex 50 used in the above process other strong acid cation exchange resins can be used for the first chromatography, e.g. Amberlite IR 112 and 120, Chempro C 20 Duolite C 25, Ionac C 240, Lewatit S 100, Nalcite HCR, HGR and HDR, Permutit Q and RS, Wofatit KPS 200 and Zeokarb (Zerolit) 225 respectively.

The second chromatography is characterized by passing the concentrated eluate from the first chromatography process through a column of a weak acid cation exchange resin. According to a preferred embodiment of this invention as weak acid cation exchange resin is used a carboxyl group containing acrylic acid polymer; the second chromatography can e.g. be accomplished with "Amberlite IRC–50" (mesh size 50–100) using as above a column of 2.5 x 35 cm. filled with 500 g. of "Amberlite IRC 50." The resin has been buffered to pH 4.7 by passing a 0.1 M solution of ammonium acetate through the column. The concentrated solution obtained by the first chromatography is placed on top of the second column and the fraction not adsorbed by the resin is collected. The elution is accomplished by passing an ammonium acetate buffer solution through the column. Both the not adsorbed fraction and the eluate are evaporated under reduced pressure and are dried by sublimation in vacuo or by lyophilization. The thus obtained product is designated as fraction N in the following part. In the above example the volume of the solution placed on the top of the column during the first chromatography has been 1000 ml. Further the column has been eluted by 1000 ml. buffer solution. The $BF_2$ activity of fraction N was 20,000 to 25,000 units per gram. The fraction comprises 12 to 16% of the original protein hydrolysate. The fraction N can be used as a halfpure preparation of $BF_2$ in foodstuffs for suckling children. Instead of the Amberlite IRC–50 used on the above process other weak acid cation exchange resins of the carboxyl type can be used for the second chromatography; examples for such resins are Duolite CS 101, Permutit H 70 and C, Wofatit CP 300 and Zeokarb (Zerolit 226) respectively.

The factor $BF_2$ can be obtained in a more concentrated form according to the following technique: A preparation is subjected to a further chromatography process using Dowex 50 W X 2 (mesh size 200–400). For chromatographing a solution of 2 g. of fraction N in 100 ml. water 750 g. of the resin in a column of 2.5 x 15 cm. can be used for example. At first the resin is treated with 0.2 N ammonium acetate buffer solution of pH 5.46. The elution is accomplished with the same buffer solution which is passed through the column at a constant rate (e.g. 120 ml./h.). The effluent fraction containing the factor $BF_2$ is collected. In the above example the desired factor is found in the fractions from 3200 to 7500 ml.

The so obtained solution is evaporated in vacuo and dried by sublimation or lyophilization. Using the most favorable reaction conditions, from 100 parts by weight of the original hydrolysate are obtained 0.56 part by weight of the product with 28% of the original $BF_2$ activity. The product has an activity of 500,000 $BF_2$-units per gram. According to another technique the fraction N is filtered through dextran gel (e.g. sephadex $G_{25}$) in an aqueous solution as concentrated as possible (e.g. 20 mg./ml.). The fraction not adsorbed by the gel is collected; it contains nearly the total factor $BF_2$ (yield 90 to 100%) and shows an activity of 25,000 to 50,000 units per gram (fraction $N_S$). This fraction can be used as a bifidogen preparation.

According to another technique the fraction N (or the fraction $N_S$ likewise) can be chromatographed in a basic anion exchange resin. Particularly preferred is a strong basic anion exchange resin such as for instance Dowex 1 X 2; however, any other basic ion exchange material producing the desired concentration of the bifidogen factor can be used.

The elution is accomplished with pyridine acetate or with collidine acetate containing increased amounts of acetic acid. The eluted products are identified by the ninhydrin reaction. They are eluted as a series of altogether about 20 peaks. The number of peaks varies dependent on the kind of the hydrolysate used for the preparation of fraction N (or $N_S$). The fraction enriched with $BF_2$ corresponds to a single peak.

EXAMPLE

The column used for the chromatography had a diameter of 2 cm., and a height of 150 cm. and was filled with Dowex I X 2; the temperature was 95° F., and the rate of flow 40 ml./h.; the eluate was collected in 10 ml. fractions.

At first the column is eluated with a pyridine acetate solution (1%; pH 8.0) then with a mixture of 1% collidine plus 1% pyridine plus so much 0.1 N acetic acid that the pH is 7.5. Then 2 N acetic acid is used for the elution (fractions 150 to 250) and finally glacial acetic acid.

A solution containing 100 to 300 mg. of fraction N is placed on the top of the column. The $BF_2$ activity is eluted with peak No. 17, the other peaks contain inactive material. The so-obtained product is designated as N$p$ or NS-$p$. Its activity is 500,000 to 1,000,000 $BF_2$ units per gram (yield of factor $BF_2$ from 20 to 70%). This product can also be used as bifodigen preparation.

If any of the various semi-purified or highly purified preparations described above are administered together with the usual fodstuff to a suckling child, in the faeces of whom no *Lactobacillus bifidus* is to be found, this bacterium is developed. After the administering a period of 1 to 15 days will elapse until *Lactobacillus bifidus* occurs in the faeces dependent on the dose. By administering 5,000 to 10,000 units $BF_2$ per day, *Lactobacillus bifidus* occurs after 10 to 15 days in the faeces and comprises from 10 to 40% of the total intestinal bacteria. By administering more than 100,000 units $BF_2$ per day the flora of bifidus develops very rapidly (in 1 to 3 days) and comprises from 50 to 95% of the total bacterial flora.

I claim:

1. Process for the manufacture of a concentrate of a bifidogen factor Bifidus 2 able to produce or maintain a flora of bifidus with suckling children not nourished with mother's milk, characterized in that a protein hydrolysate containing this factor is chromatographed at first in a strong acid cation exchange resin followed by chromatography in a weak acid cation exchange resin.

2. The process of claim 1, characterized in that the strong acid cation exchange resin is a polystyrene resin containing sulfonic acid groups and that the weak acid cation exchange resin is a polyacrylic acid resin containing carboxyl groups.

3. The process of claim 1, characterized in that the eluate of the second chromatography process is further chromatographed in a basic anion exchange resin.

4. The process of claim 3 characterized in that the basic anion exchange resin is a strong basic ion exchange resin with quaternary ammonium groups.

References Cited

Rose et al., Proc. Soc. ExpH. Biol. Med., vol. 112, pp. 923–6 (1963).

Sephadey Literature Reference Cards: #59, Phillips et al., Biochemical J. (1961) and #77, Miranda et al., J. Chromatography (1962).

JOSEPH M. GOLIAN, Primary Examiner

U.S. Cl. X.R.

99—54, 63